April 13, 1965 J. H. VARTERASIAN 3,178,641

DRAG CUP TACHOMETER ACCELEROMETER

Filed Feb. 6, 1961

INVENTOR.
John H. Varterasian
BY
Paul J. Ethington
ATTORNEY

United States Patent Office 3,178,641
Patented Apr. 13, 1965

3,178,641
DRAG CUP TACHOMETER ACCELEROMETER
John H. Varterasian, Detroit, Mich., assignor to General Motors Corporation, Detroit, Mich., a corporation of Delaware
Filed Feb. 6, 1961, Ser. No. 87,240
11 Claims. (Cl. 324—70)

This invention relates to a tachometer accelerometer and in particular to a system including a generator having an output proportional to speed and another output proportional to acceleration of its rotor.

Frequently, it is necessary to determine simultaneously the speed and acceleration of a rotating part such as the output shaft of an engine or electrical motor as well as the moving parts of certain mechanisms for control or test purposes. That is conventionally done by two separate apparatus to measure the two parameters. It is an object of this invention to provide one simple and compact mechanism to simultaneously produce electrical outputs which are proportional to the speed and acceleration of a mechanical input.

Figure 1:
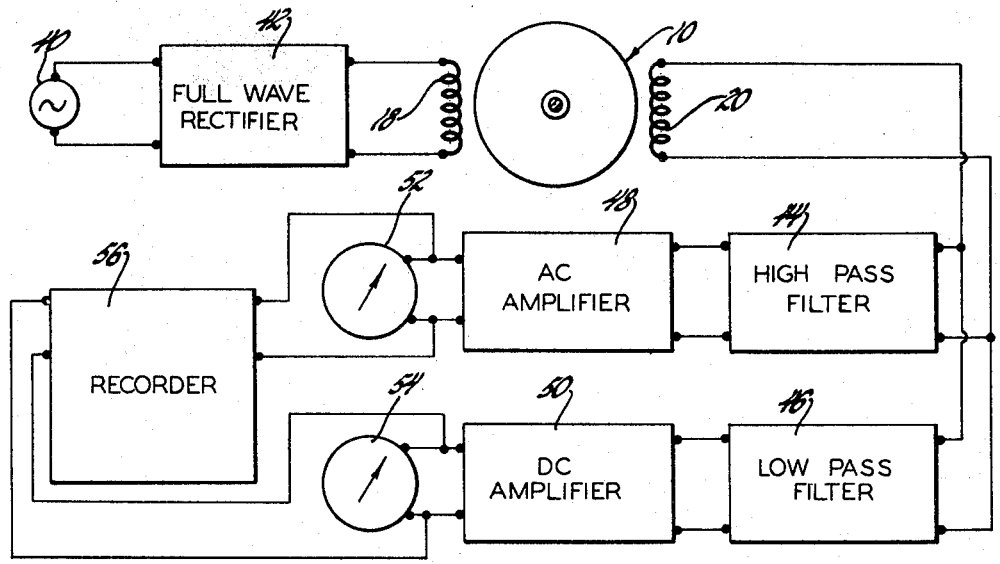
Figure 2:
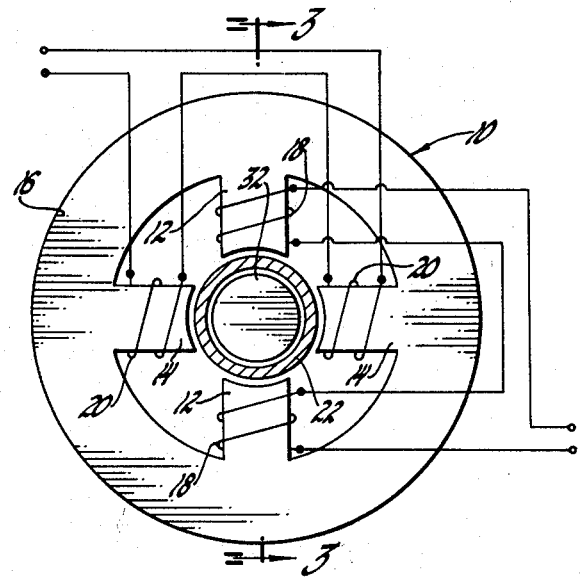
Figure 3:
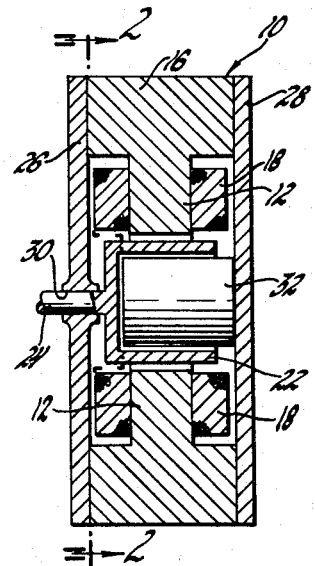

This invention provides a drag cup tachometer generator with alternating current and direct current excitation which has alternating and direct current output signals which are functions of the drag cup speed and acceleration. The above and other advantages will be made more apparent from the following specification taken in conjunction with the accompanying drawings in which:

FIGURE 1 is a schematic diagram of an electrical system according to the invention, FIGURE 2 is a cross sectional view of the tachometer generator of FIGURE 1 taken along the lines 2—2 of FIGURE 3, and FIGURE 3 is a cross sectional view of a tachometer generator along the lines 3—3 of FIGURE 2.

Referring to FIGURES 2 and 3 of the drawing a tachometer generator 10 is formed by providing two pairs 12 and 14 of poles extending inwardly from an annular stator 16. Opposing pairs 12 and 14 of poles are wound in series with coils 18 and 20 respectively so that one pair 18 of coils comprises an input or exciting winding while the other pair 20 comprises an output winding. Both poles of each pair are wound in the same direction, as shown, so that a current flowing in either coil 18 or 20 will produce additive flux fields. The rotor of the tachometer 10 is a hollow cylindrical drag cup 22 of conductive material such as copper disposed concentrically with the stator 16 and secured to a rotatable shaft 24 which is connected by some means (not shown) to the device whose rotation is to be measured. Each side of the stator 16 is covered with a plate 26 or 28. One plate 26 has an aperature 30 to admit and support the rotatable shaft 24 while the other plate 28 supports a centrally located soft iron core 32 which extends into the hollow drag cup 22.

It is known that such a tachometer generator will, when its input coils 18 are excited by an alternating current produce an alternating voltage in the output coils 20 having a magnitude proportional to the speed of the drag cup 22. If the exciting coils 18 are supplied with direct current then the output coils will produce a D.C. voltage which is proportional to the acceleration of the drag cup 22. The present invention contemplates that if an input signal to the exciting coils of such a tachometer generator has both an A.C. and D.C. component, then the output of the generator will have corresponding components which are functions of the speed and acceleration of the drag cup 22. Accordingly, the system of FIGURE 1 has been evolved wherein the tachometer generator 10 has its input windings 18 excited by an A.C. source 40 which is passed through a full wave rectifier 42, so that the input current will have both A.C. and D.C. components. The output windings are connected with a high pass filter 44 and a low pass filter 46 for segregating the speed dependent alternating signal from the acceleration dependent direct current signal. Each of the filter outputs is sent to a suitable amplifier 48 or 50 and finally is fed to an indicating meter 52 or 54 and/or a common recorder 56.

It is thus seen that a system comprising a single generator may be used to indicate both the speed and acceleration of a rotating shaft or other rotary element. The outputs may be utilized in the desired manner such as providing visual information of speed and acceleration or, if desired, to operate a recorder. One very convenient use of such a recorder is as a dynamometer wherein the speed signal could be fed to the X axis while the acceleration could be fed to the Y axis. Since acceleration is proportional to torque, the resulting curve would be an indication of the power characteristics of the device being tested. Another important use of the system is in servomechanism systems where the speed and acceleration voltages may be used for feedback purposes.

The preferred embodiment of the invention disclosed herein is not intended to limit the scope of the invention which is defined by the following claims.

I claim:

1. Apparatus for providing an indication of the angular velocity and acceleration of a rotating shaft comprising a drag cup tachometer generator having a rotor coupled to said shaft, a source of direct current excitation with an alternating current component superimposed thereon connected across the input of said generator, first indicating means responsive to alternating current connected across the output of said generator, and second indicating means responsive to direct current connected across the output of said generator.

2. Apparatus for providing an indication of the angular velocity and acceleration of a rotating shaft comprising a drag cup tachometer generator having a rotor coupled to said shaft, a source of direct current excitation with an alternating current component superimposed thereon connected across the input of said generator, high pass and low pass filters connected across the output of said generator, first indicating means responsive to alternating current connected across the output of said high pass filter, and second indicating means responsive to direct current connected across the output of said low pass filter.

3. Apparatus for providing an indication of the angular velocity and acceleration of a rotating shaft comprising a drag cup tachometer generator having a rotor coupled to said shaft, a source of direct current excitation with an alternating current component superimposed thereon connected across the input of said generator, high pass and low pass filter means connected across the output of said generator, means for amplifying said output, first indicating means responsive to alternating current connected with the output of said high pass filter and second indicating means responsive to direct current connected with the output of said low pass filter.

4. Apparatus for providing an indication of the angular velocity and acceleration of a rotating shaft comprising a drag cup tachometer generator having a rotor coupled to said shaft, a source of direct current excitation with an alternating current component superimposed thereon connected across the input of said generator, high pass and low pass filter means connected across the generator output, an A.C. amplifier in series with said high pass filter, first indicating means connected across the output of said amplifier, a D.C. amplifier in series with said low pass filter, and second indicating means connected across the output of said D.C. amplifier.

5. Apparatus for providing an indication of the angular velocity and acceleration of a rotating shaft comprising a tachometer generator having a cup-type rotor of conductive material coupled to said shaft, a source of excitation connected to the generator input, said source providing direct current with an alternating current component superimposed thereon, and first and second indicating means connected to the generator output, said first indicating means being responsive to alternating current output to provide an indication of the angular velocity of said shaft, said second indicating means being responsive to direct current output to provide an indication of the angular acceleration of said shaft.

6. Apparatus for providing an indication of the angular velocity and acceleration of a rotating shaft comprising a tachometer generator having a cup-type rotor of conductive material coupled to said shaft, said generator including a stator having at least four poles, an input winding linking two of said poles, a source of excitation connected to said input winding, said source providing direct current with an alternating current component superimposed thereon, an output winding linking another two of said poles, and first and second indicating means connected to said output winding, said first indicating means being responsive to alternating current output to provide an indication of the angular velocity of said shaft, said second indicating means being responsive to direct current output to provide an indication of the angular acceleration of said shaft.

7. Apparatus for providing an indication of the angular velocity and acceleration of a rotating shaft comprising a tachometer generator having a cup-type rotor of conductive material coupled to said shaft, said generator including a stator having a multiple of four poles, an input winding linking alternate poles, a source of excitation connected to said input winding, said source providing direct current with an alternating current component superimposed thereon, an output winding linking the remainder of said poles, and first and second indicating means connected to said output winding, said first indicating means being responsive to alternating current output to provide an indication of the angular velocity of said shaft, said second indicating means being responsive to direct current output to provide an indication of the angular acceleration of said shaft.

8. Apparatus for providing an indication of the angular velocity and acceleration of a rotating shaft comprising a tachometer generator having a cup-type rotor of conductive material coupled to said shaft, said generator including a stator having at least four poles, an input winding linking two of said poles, a source of excitation connected to said input winding, said source providing direct current with an alternating current component superimposed thereon, an output winding linking another two of said poles, high pass and low pass filters connected to said output winding, and first and second indicating means connected to said high pass and low pass filters respectively, said first indicating means being responsive to alternating current output to provide an indication of the angular velocity of said shaft, said second indicating means being responsive to direct current output to provide an indication of the angular acceleration of said shaft.

9. Apparatus for providing an indication of the angular velocity and acceleration of a rotating shaft comprising a tachometer generator having a cup-type rotor of conductive material coupled to said shaft, said generator including a stator having at least four poles, an input winding linking two of said poles, a source of excitation connected to said input winding, said source providing direct current with an alternating current component superimposed thereon, an output winding linking another two of said poles, high pass and low pass filters connected to said output winding, amplifiers connected to said filters, and first and second indicating means each connected to an amplifier, said first indicating means being responsive to alternating current output to provide an indication of the angular velocity of said shaft, said second indicating means being responsive to direct current output to provide an indication of the angular acceleration of said shaft.

10. Apparatus for providing an indication of the angular velocity and acceleration of a rotating shaft comprising a drag cup tachometer generator having a rotor coupled to said shaft, means for providing a unidirectional field with an alternating component in said generator, first indicating means responsive to alternating current connected across the output of said generator, and second indicating means responsive to direct current connected across the output of said generator.

11. Apparatus for providing an indication of the angular velocity and acceleration of a rotating shaft comprising a tachometer generator having a cup-type rotor of conductive material coupled to said shaft, means for providing a unidirectional field with an alternating component in said generator, and first and second indicating means connected to the generator output, said first indicating means being responsive to alternating current output to provide an indication of the angular velocity of said shaft, said second indicating means being responsive to direct current output to provide an indication of the angular acceleration of said shaft.

References Cited by the Examiner
UNITED STATES PATENTS

| 2,940,038 | 6/60 | Probert | 324—70 |
| 2,944,419 | 7/60 | Paalu | 324—70 |

WALTER L. CARLSON, *Primary Examiner.*
SAMUEL BERNSTEIN, *Examiner.*